United States Patent [19]

Ames et al.

[11] 4,367,980

[45] Jan. 11, 1983

[54] METHOD AND APPARATUS FOR COMPLETING DIVERLESS SUBSEA LARGE DIAMETER FLOWLINE CONNECTIONS

[75] Inventors: Thomas J. Ames, Houston; Glen H. Cuiper, Spring, both of Tex.

[73] Assignee: FMC Corporation, Chicago, Ill.

[21] Appl. No.: 175,621

[22] Filed: Aug. 5, 1980

[30] Foreign Application Priority Data

Sep. 29, 1979 [GB] United Kingdom ................. 7933859

[51] Int. Cl.$^3$ .............................................. F16L 1/04
[52] U.S. Cl. ................................................... 405/169
[58] Field of Search ............... 405/168, 169, 170, 195; 166/338–343, 366; 285/24, 27

[56]  References Cited

U.S. PATENT DOCUMENTS

| 3,517,735 | 6/1970 | Fairbanks et al. | 166/366 |
| 3,589,441 | 6/1971 | Brown | 166/339 |
| 3,602,301 | 8/1971 | James | 166/338 |
| 3,701,261 | 10/1972 | Nolan | 166/366 X |
| 3,721,294 | 3/1973 | Nelson | 166/343 X |
| 4,161,367 | 7/1979 | Cuiper et al. | 405/169 |

Primary Examiner—Dennis L. Taylor
Attorney, Agent, or Firm—L. B. Guernsey; W. W. Ritt, Jr.; R. B. Megley

[57] ABSTRACT

A diverless subsea flowline connection system includes a plurality of connectors for remotely connecting the end of a bundle of flowlines to the ends of a plurality of bundles of individual flowlines. Guidance components direct the end portion of each bundle of individual flowlines into precise connecting alignment with a corresponding end portion of the bundled flowlines without damage to the connecting seals. The end portion of the bundled flowlines are covered and sealed so that these flowlines can be pulled across a sea floor without damage to their connecting ends. Means are provided for pulling the flowline bundle toward an aligning structure so that the lines can approach the structure from a wide variety of angles and the structure will guide the bundled flowlines into position where they can be aligned exactly with the individual diameter flowlines. This pulling means includes means for connecting a pulling cable to the radial center of a pulling head attached to the ends of the bundled flowlines. The ends of the individual flowlines are connected to connector lugs and aligned before the fluid-tight seals are set to prevent possible damage to the seals. After the individual flowline ends are precisely aligned the seals are set. The pulling, aligning, replacement of seals and fluid-tight connecting of the individual flowlines is all directed by remote control from the surface of the sea.

14 Claims, 15 Drawing Figures

FIG_1

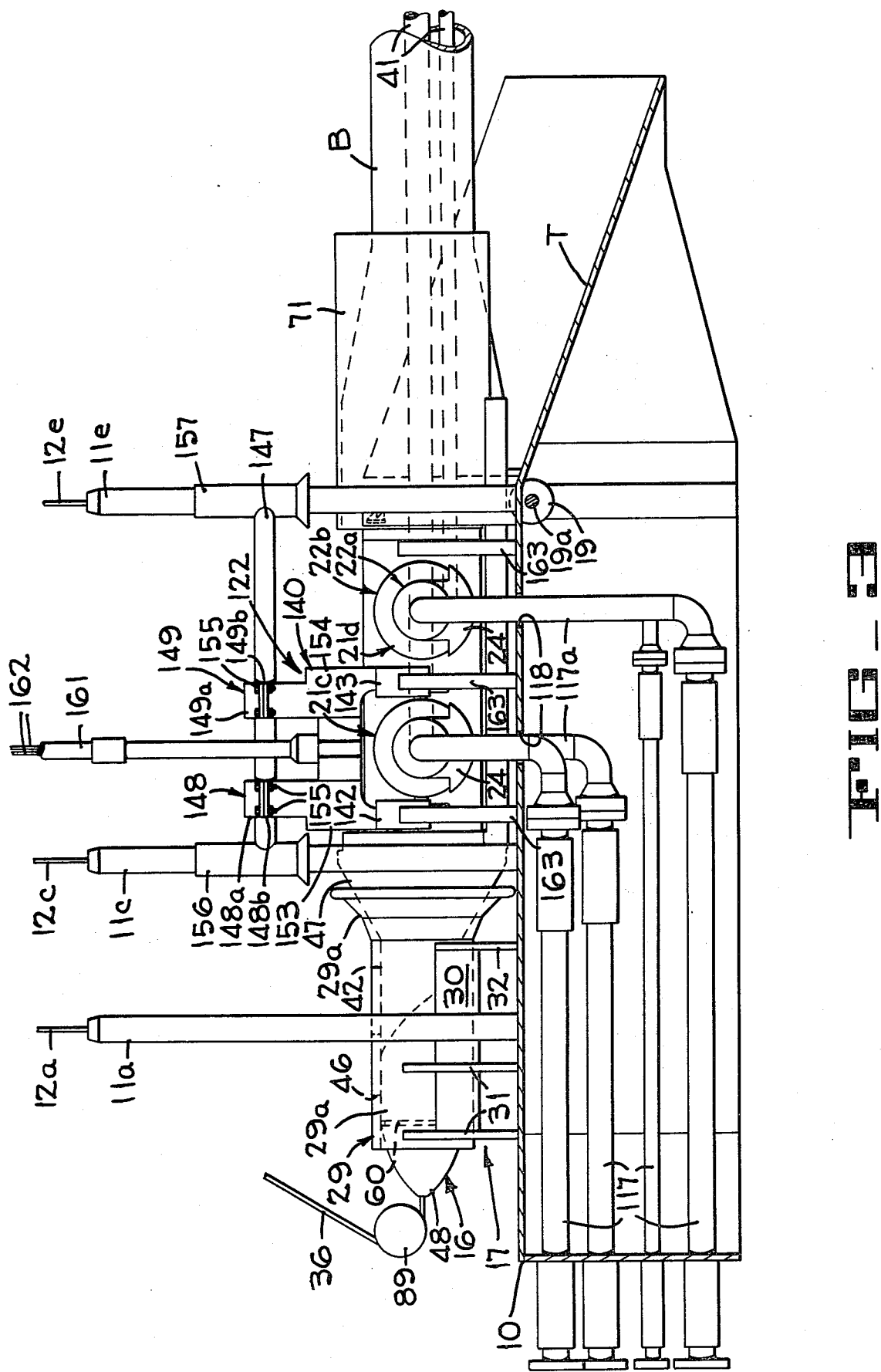

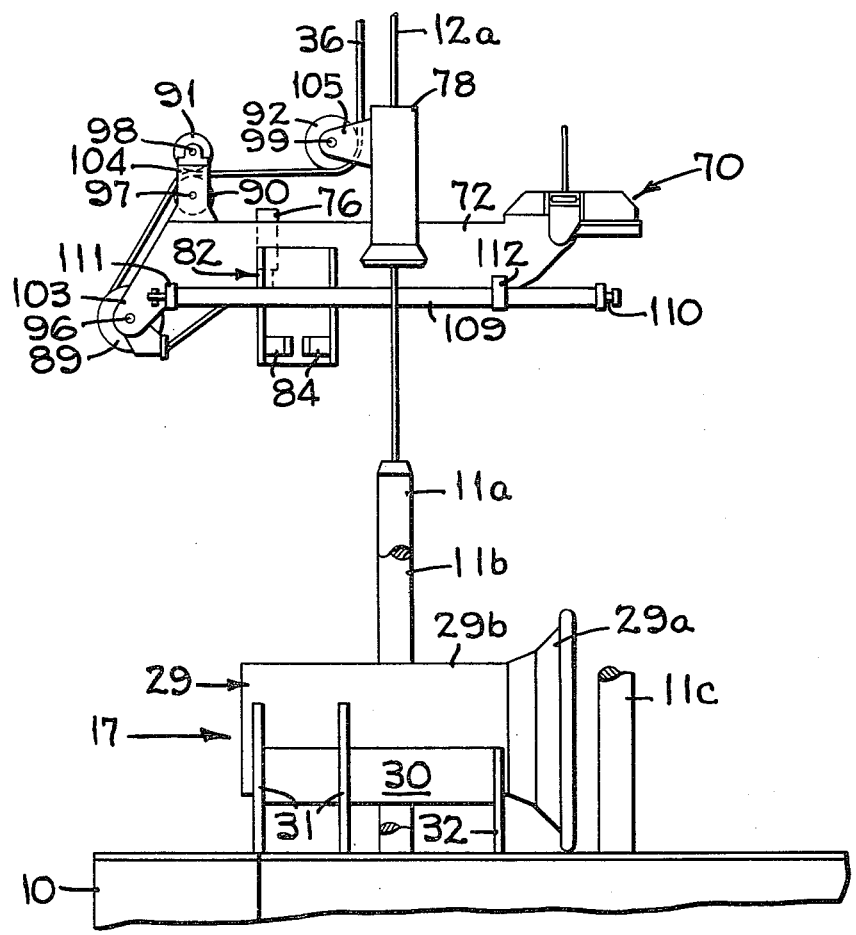
FIG_4
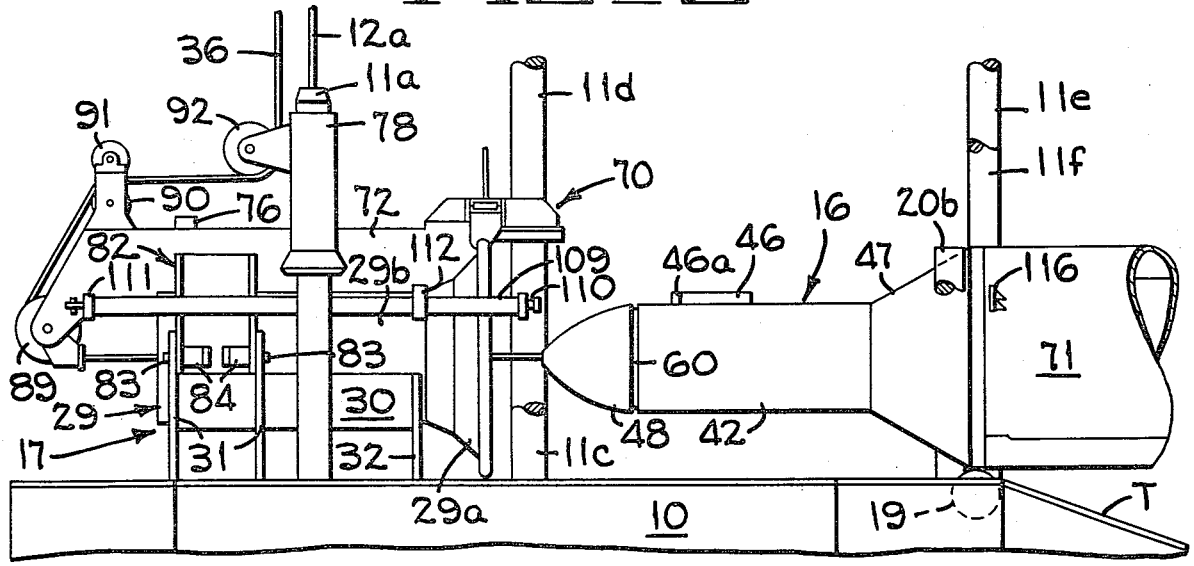
FIG_5

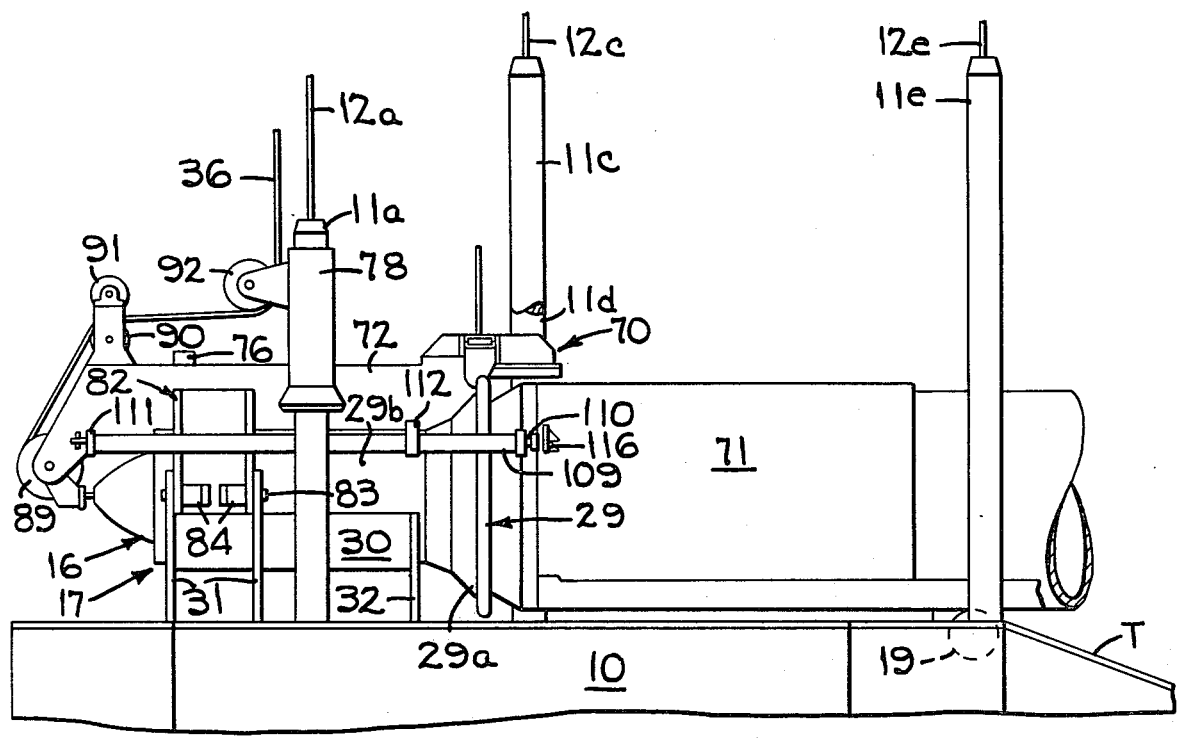
FIG_6
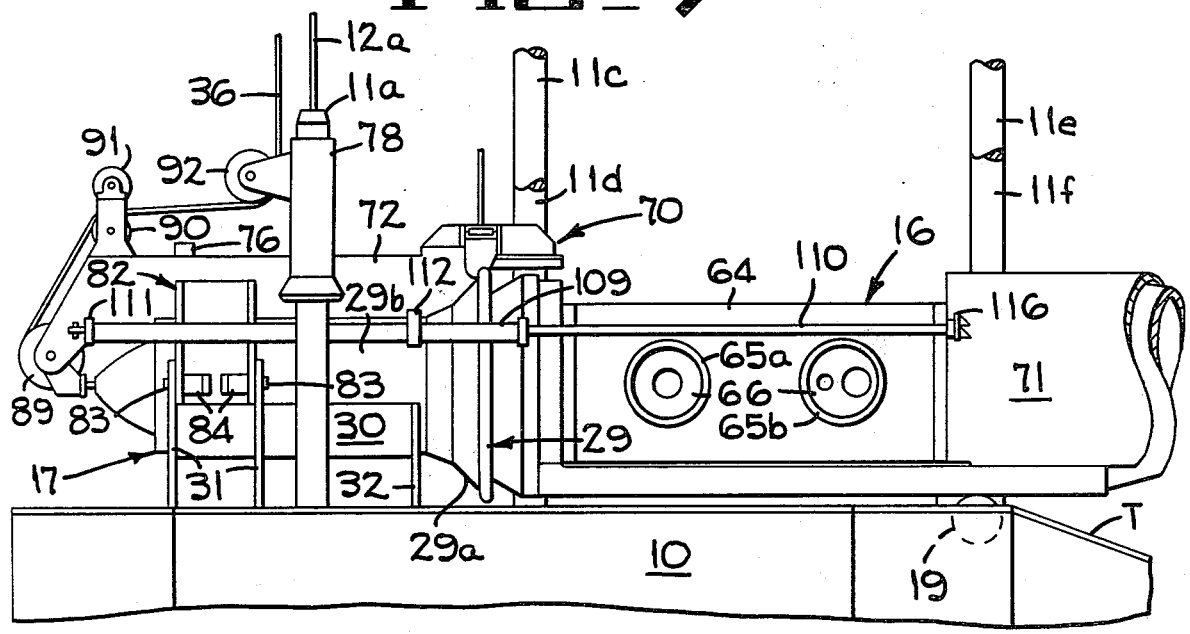
FIG_7

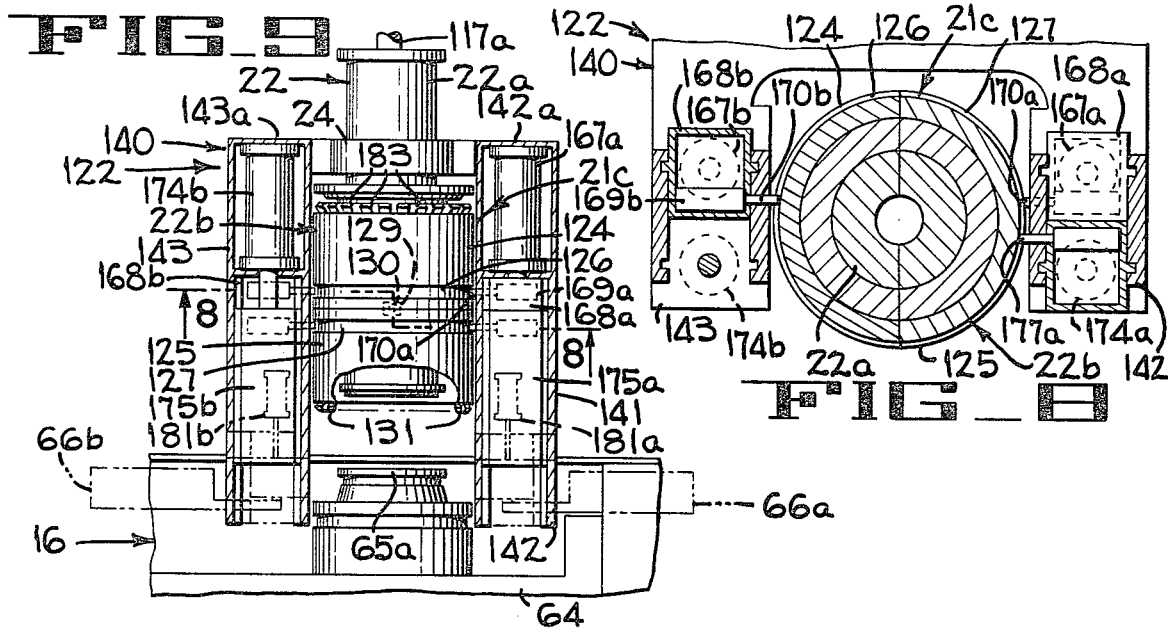
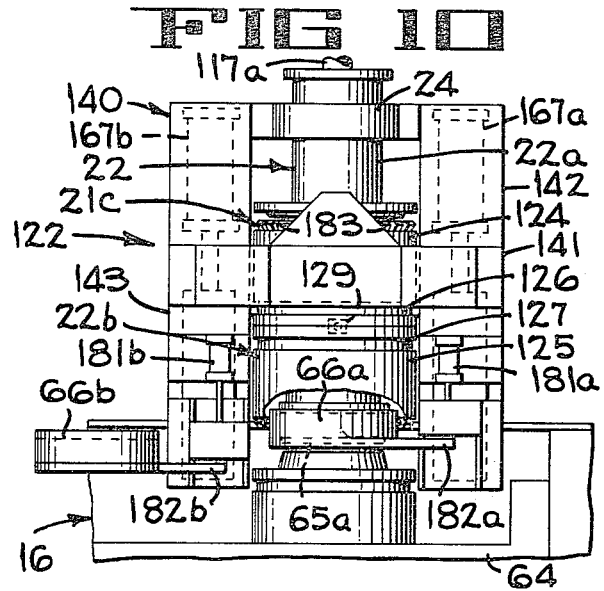
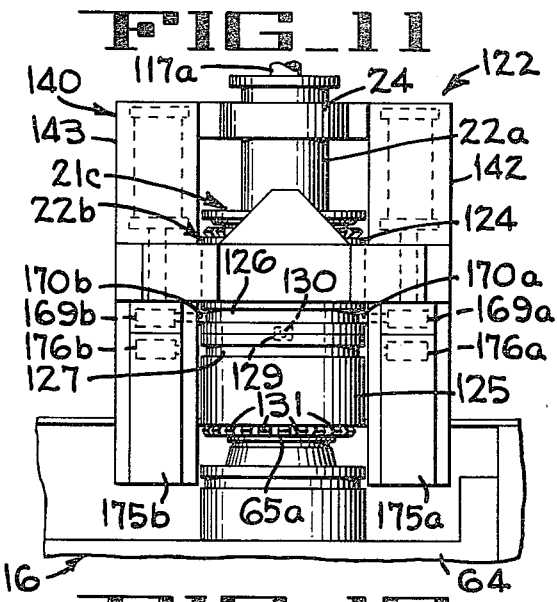
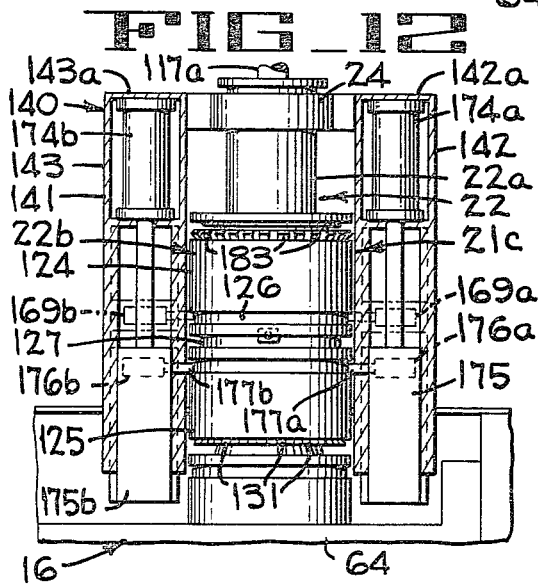
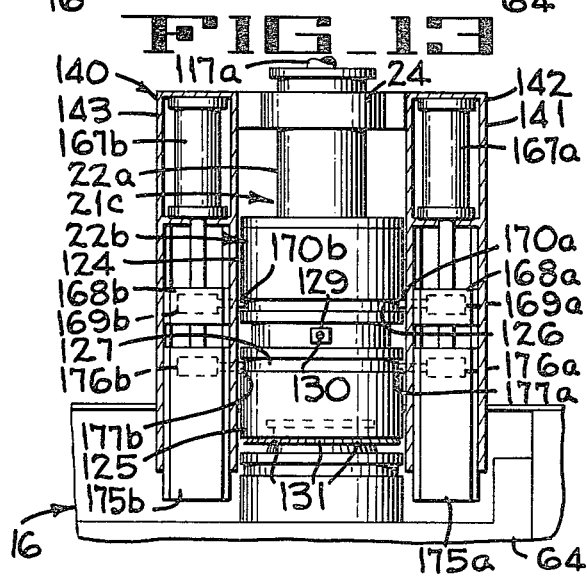

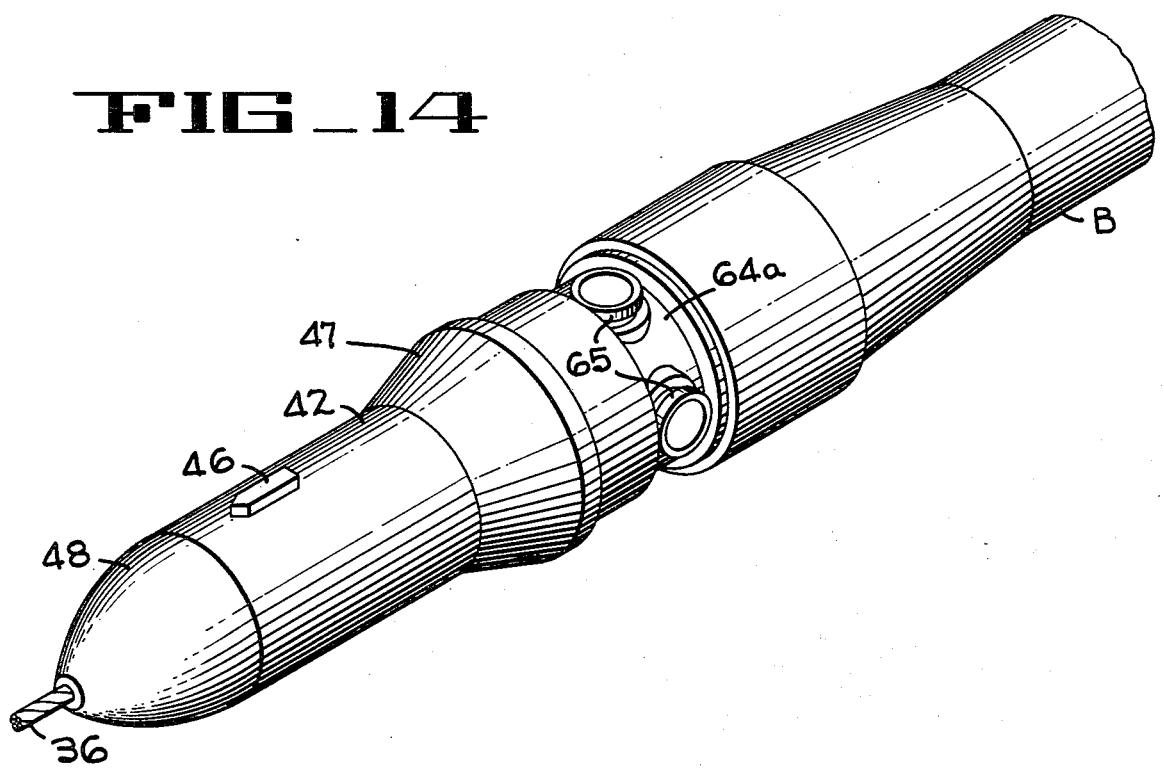
FIG_14
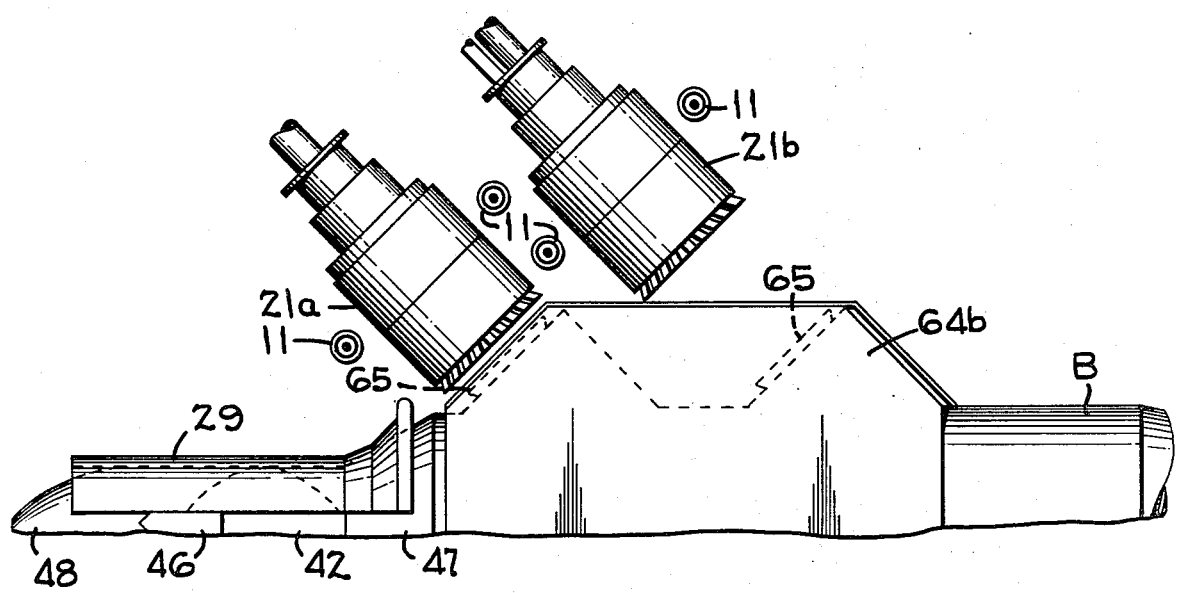
FIG_15

METHOD AND APPARATUS FOR COMPLETING DIVERLESS SUBSEA LARGE DIAMETER FLOWLINE CONNECTIONS

BACKGROUND OF THE INVENTION

1. Field of the Invention

This invention relates to subsea flowline connecting systems, and more particularly to a remote control system for precise alignment and connection of a plurality of bundles of individual flowlines to a single large diameter bundle of flowlines.

DESCRIPTION OF THE PRIOR ART

The production of oil and gas from offshore wells has developed into a major endeavor of the petroleum industry. Wells are commonly drilled several hundred or even several thousand feet below the surface of the ocean. These wells must not only be drilled without the use of divers at the greater depths, but the connecting, testing and servicing of the pipes and of regulating valves must be performed on these wells during and after the drilling process.

One of the major problems of subsea installation is the connecting of flowlines to transport the oil from the well after the well has been drilled and a subsea christmas tree assembly has been lowered and fastened in place on the well. A plurality of short flowline loops are connected to the christmas tree assembly before the tree assembly is lowered into place atop the well and the free ends of the flowlines are gathered together and supported above the sea floor to facilitate connecting other flowline loops to the tree side flowline loops. Another plurality of flowlines have the first ends thereof connected to a storage container and the second ends thereof gathered into a bundle and lowered to the sea floor for connecting to the flowline loops on the tree assembly. The flowline bundle is then pulled across the sea floor into alignment with the flowline loop so that the flowline bundle and the flowline loops can be connected together in a fluid-tight connection.

In locations where wells provide a large flow of gas or oil, large diameter flowline bundles, such as those having 24 inch diameter or larger, are connected between the underwater facility and a storage container or tanker at a loading area. Such a large flowline bundle cannot be laid off the reel barge, but is usually fabricated on shore and installed by performing an "off the bottom" pull using flotation and dead weights to suspend the bundle just above the ocean floor while the flowline bundle is pulled into position at the wellhead. These large flowline bundles may include control lines, production lines, sensor lines, steam lines and other lines, all in one large bundle.

It may not be practical or desirable to employ a single multi-bore flowline connector, as it is undesirable to break all of the seals to the various lines to service a seal for a single line. Also the force required to connect a pair of large diameter connectors would be so large as to be impractical. A more practical solution is to connect each of the individual bores of a multi-bore flowline to individual connectors or to connect a few of the bores to a connector. Some of the prior art multi-bore flowlines use a horizontal grouping of one set of connectors mounted on a sled-type structure which is pulled into connecting alignment with a mating set of connectors. This arrangement requires very massive receiving and aligning structures and requires two pull-in cables. If one of the two cables breaks the remaining cable is useless, and if the sled of the dual cable unit flips over the problem of righting the sled is very serious. Another solution is to stack the connectors one on top of the other in a vertical grouping with the axis of the connectors being parallel. This results in a high center of gravity for the assembly and the problem of access to the bottom connectors.

SUMMARY OF THE INVENTION

The present invention overcomes some of the disadvantages of the prior art by using a first connector mounted on one end of a large diameter flowline bundle, and a plurality of individual connectors each mounted on one end of a corresponding one of a plurality of individual flowlines. The first connector includes a plurality of connector hubs each attached to the large flowline bundle. A pull-in cable is attached to the geometric center of the end of the first connector so that the flowline bundle can be pulled directly toward a fixed position adjacent the individual connectors and clamped in this fixed position. Means are provided for moving each of the individual connectors into precise axial alignment with a corresponding one of the connector hubs, and for securing the individual connectors in this alignment without setting the seals. Once the connectors have been secured, the seals are set to provide a fluid-tight relationship between each of the individual connectors and its connector hub. This procedure of first aligning the individual connectors with their connector hubs and then setting the seals prevents damage to the sealing members as the connectors are moved into contact alignment.

BRIEF DESCRIPTION OF THE DRAWINGS

FIG. 3 is an enlarged section taken along line 3—3 of the connecting apparatus of FIG. 2.

FIGS. 4–7 are enlarged side elevations of the connecting apparatus of FIG. 3, showing a sequence of operation of a running tool which pulls the flowline bundle into position for connection.

FIG. 8 is a section taken along the line 8—8 of FIG. 9.

FIGS. 9–13 are plan views of a running tool which is used to connect the smaller connectors to the flowline bundle, showing a sequence of operation.

FIGS. 14 and 15 illustrate alternate embodiments of the connecting apparatus shown in FIGS. 1–13.

DESCRIPTION OF THE PREFERRED EMBODIMENT

Embodiment of FIGS. 1–9

Figure 1:
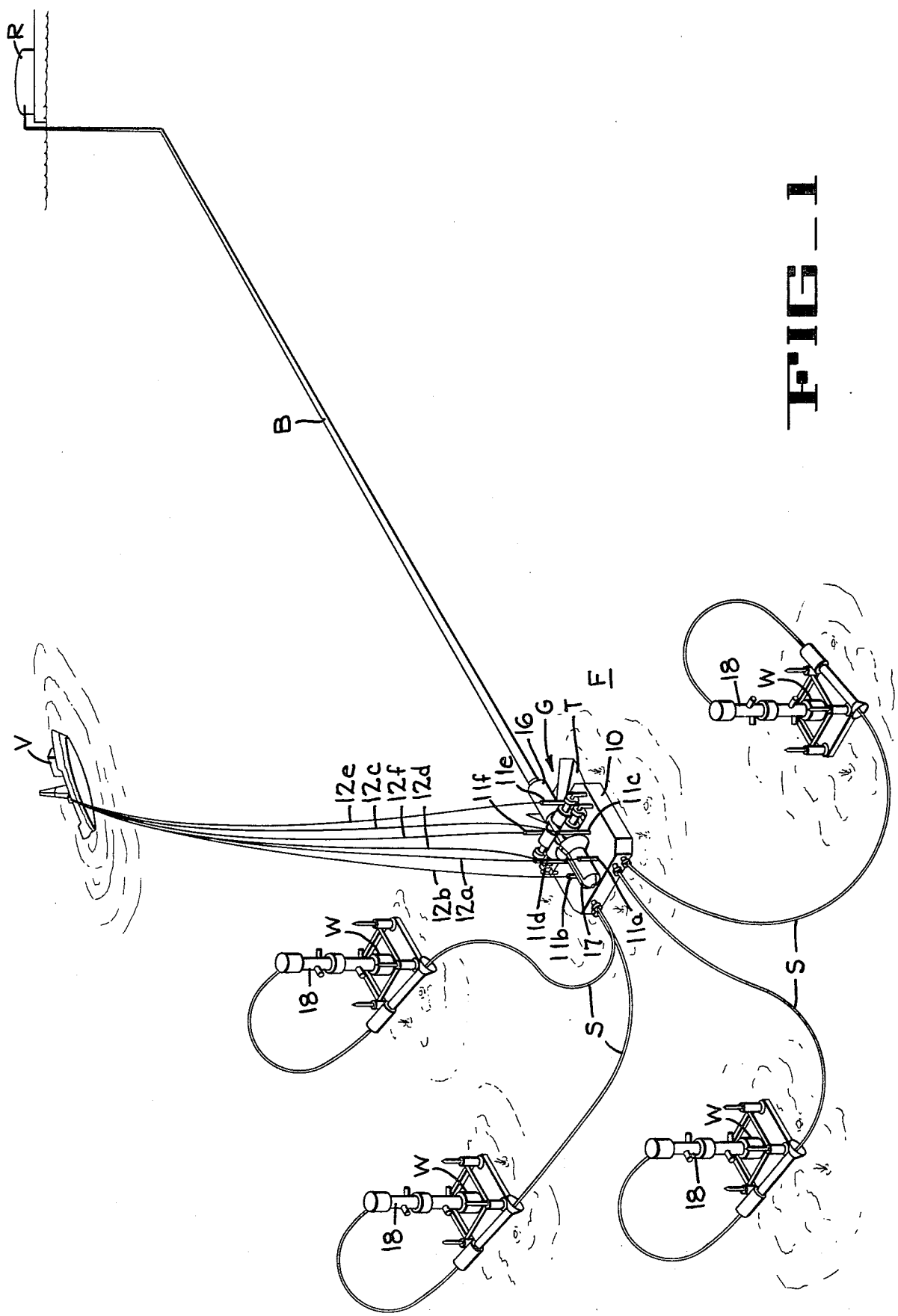
FIG. 1 is a diagrammatic isometric view of an offshore fluid connecting and transfer system, with a large diameter flowline bundle extending from a fluid storage facility to a collection area, and having a flowline connector of the present invention between the large diameter flowline bundle and a plurality of smaller flowlines extending from the collection area to individual subsea wells.

An offshore fluid collecting and transferring system employing the diverless subsea flowline connectors illustrated in detail in FIGS. 2–13 is diagrammatically represented in FIG. 1. This system comprises a plurality of small flowlines S, each extending between one of a plurality of subsea wells W and a gathering zone G, and a large diameter flowline bundle B extending along the ocean floor F from the gathering zone G to a storage reservoir or terminal R. The gathering zone G comprises a landing base 10 (FIGS. 1–4) with a plurality of guide posts 11a–11f, and a guide line 12a–12f extending upward from the top of each guide post to a surface vessel V used to direct connection and service operations on the landing base 10. A flowline bundle hub assembly 16 connected to the end of the flowline bundle B is guided into operating position and secured to the landing base 10 by a funnel assembly 17 mounted on the landing base. A ramp T between the ocean floor F and the upper portion of the landing base 10 and a roller 19 (FIG. 3) rotatably mounted on a shaft 19a facilitate movement of the flowline bundle into position on base 10. A pair of cam members 20a, 20b (FIG. 2) direct the flowline bundle hub assembly 16 into the funnel assembly 17.

A first end of each of the small flowlines S is connected to one of a plurality of christmas trees 18 with the flowlines S each being in the form of a loop having sufficient radius so that conventional through-flow-loop (TFL) tools (not shown) can pass through the flowlines. A second end of each of the tree side flowlines S is connected through the landing base 10 to a generally cylindrical tree side flowline connector 21a–21d (FIG. 2) having a small cylindrical portion 22a on one end and a larger portion 22b on the other end. Each of the flowline connectors 21a–21d (FIG. 2) is held in place by a retaining structure 23 having the bottom portion mounted on the landing base 10 and having an annular sleeve 24 at the upper portion thereof. The flowline connectors 21a–21d each have the smaller cylindrical portion 22a mounted inside the sleeve 24 with a shear pin 28 between the sleeve 24 and the connector 21a–21d to retain the connector in position with the larger portion 22b of the connector adjacent the sleeve 24 while the large bundle hub assembly is moved into position adjacent the flowline connectors. A curved support structure 25 (FIG. 2) connected to the landing base 10 supports each of the connectors 21a–21d.

The alignment funnel assembly 17, comprising an alignment funnel 29 (FIGS. 2–7) and a mounting base 30, is welded or otherwise secured to a plurality of brackets 31,32 welded to the landing base 10. The alignment funnel 29 (FIG. 2) includes a slot 34 running along the length thereon and an enlarged bell portion 29a positioned to guide the flowline bundle assembly 16 into alignment with the flowline connectors 21a–21d. Attached to the left end of the flowline bundle hub assembly 16 (FIG. 2) is a pull-in cable 36 connected to the geometric center of the hub assembly 16 by a swage pin 40. The cable 36 is aligned along the same axis as the flowline bundle hub assembly 16 and along the line of a plurality of flowlines 41 (FIG. 3) which are fixed to the bundle hub assembly 16. Thus, the force exerted by the pull-in cable 36 is on the same axial line as the drag exerted by the flowlines 41 when the bundle hub assembly 16 is pulled toward the alignment funnel 29.

The flowline funnel hub assembly 16 includes an annular body portion 42 (FIGS. 2,5) having a frustoconical end portion 47 at its right end, and an alignment key 46 extending axially along the body portion toward a nose portion 48 on its left end. The width of the alignment key 46 is slightly smaller than the width of the slot 34 of the funnel 29. The swage pin 40 is releasably secured in the nose portion 48 by a mechanism which is more fully described in Cuiper et al U.S. Pat. No. 4,161,367, issued July 17, 1979. If the pull-in cable 36 should break, the swage pin 40 can be removed and a replacement pull-in cable and attached pin can be secured in the nose portion 48 of the bundle hub body 42. The swage pin 40 can be released by inserting an elongated pin (not shown) into a bore 52 (FIG. 2) and activating a release mechanism as disclosed in the aforementioned U.S. Pat. No. 4,161,367.

A mule shoe 53, mounted inside the funnel 29, provides rotational alignment of the bundle hub assembly 16 as it is pulled into the funnel 29. The wedge-shaped key portion 46a of the alignment key (FIG. 2) contacts a cam surface 54 of the mule shoe as the bundle hub assembly 16 is pulled into the funnel 29. As the bundle hub assembly moves further into the funnel the key 46 rides along the surface 54 which rotates the assembly 16 until the key 46 is guided into the slot 34 and pulled toward the left of the funnel.

A pair of spring-loaded latching members 58,59 are mounted in the cylindrical portion 29b (FIG. 2) of the funnel 29 near its left end. The latching members are each biased radially inward by springs (not shown). When the flowline bundle hub 16 enters the cylindrical portion 29b of the funnel 29 the rounded nose portion 48 of the flowline bundle hub moves against the latching members 58,59 and forces them radially outward while the bundle hub 16 continues toward the left end (FIG. 2) of the funnel 29. When the left end portion of the bundle hub assembly 16 reaches the latching members they snap into an annular groove 60 in the bundle hub and lock the hub in the funnel 29. The swage pin 40 can then be removed and the connectors 21a–21b locked to the connector hubs 65a–65d.

The flowline bundle of assembly 16 further includes a bore manifold 64 (FIGS. 2,3,7) having a plurality of connector hubs 65a–65d (FIG. 7) (only two being shown) each positioned for connection to a corresponding one of the flowline connectors 21a,21d. Mounted in each of the connector hubs 65a–65d is a replaceable seal plate assembly 66 (FIG. 7) for providing a fluid-tight seal between the connectors 21a,21d and one or more of the flowlines 41 in the flowline bundle B.

A running tool 70 (FIGS. 4–7) performs the function of pulling the flowline bundle hub assembly 16 into the funnel 29 and removing a protective shroud 71 from the manifold 64 of the flowline bundle hub assembly 16. The running tool contains all of the power operated devices for performing these operations and the running tool can be returned to the surface after the subsea operations are completed. Thus, none of the connectors which remain on the sea floor contain any power operated devices which could deteriorate while in the water.

The running tool 70 includes a sheave frame having a pair of parallel side members 72 (only one shown in FIGS. 4–7) interconnected by a plurality of cross-members 76. A pair of sleeves 78 (only one shown), secured to the side members 72, direct the running tool 70 down the guidelines 12a–12b and guideposts 11a–11b into a working position astride the funnel 29. The running tool 70 further includes a pair of latching members 82 (one shown) each of which is welded or otherwise secured to a corresponding one of the side members 72. The latching members 82 each include a pair of latching pins 83 (FIG. 5) which are moved into and out of a locking position by an associated hydraulic cylinder 84. The latching pins 83 fit into holes 88 (FIG. 2) in the upper portion of the brackets 31 on the landing base 10 to lock the running tool 70 in proper operating position. The running tool 70 (FIG. 4) also includes a plurality of sheaves 89-92 each rotationally mounted to the side members 72 by a pin 96-99 and a plurality of pairs of ears 103-105 (only one of each pair of ears being shown). A pair of hydraulic rams 109 (only one being shown), each having an extendable rod 110, are connected to the side member 72 of the running tool 70 by a pair of brackets 111,112. One end of the cable 36 is attached to the swage pin 40 (FIG. 2), and from this pin the cable extends between the side members 72 (FIG. 4) of the running tool, over the sheaves 89, 90, 92, and finally to a winch (not shown) on the vessel V (FIG. 1). The swage pin and the attached cable are retained on board the vessel V while the winch plays out the cable over the sheaves 92,90,89 to lower the running tool down the guidelines 12a-12b toward the alignment funnel 29.

Figure 2:
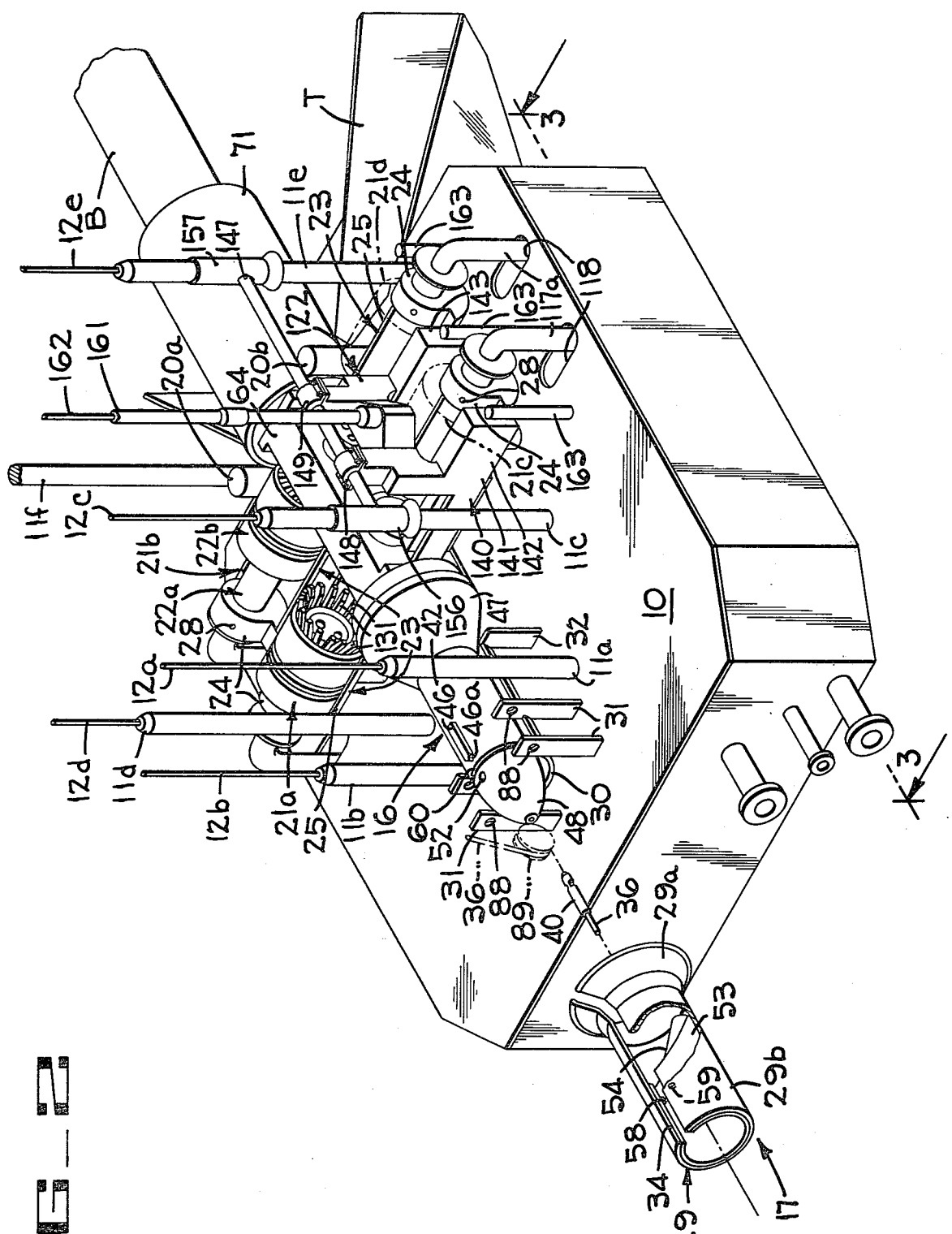
FIG. 2 is an isometric view of a diverless subsea flowline connection system according to the present invention, illustrating the connecting apparatus with a funnel portion detached.

The sequence of operation to pull the bundle hub assembly 16 into position adjacent the flowline connectors 21a-21d (FIG. 2) and to remove the protective shroud 71 is sequentially shown in FIGS. 4-7. The running tool 70 is lowered down the guidelines 12 over the guide posts 11a-11b (FIGS. 2,4) by the cable 36 and locked into working position (FIG. 5) with one end of the pull-in cable 36 attached to a winch (not shown) on the surface vessel V (FIG. 1) and the other end of the cable 36 attached to the flowline bundle hub assembly 16. The sheaves 89,90,92 convert the vertical pull of the winch on the cable 36 into a substantially horizontal force on the flowline bundle hub assembly 16 and pull the body portion 42 (FIG. 5) into the funnel 29 (FIGS. 2,4-7). The body portion 42 is moved into the funnel 29 until the spring loaded member 58,59 (FIG. 2) on the funnel 29 move into the groove 60 to lock the body portion 42 in the funnel 29. The bore manifold 64 is now adjacent the flowline connectors 21a-21d (FIGS. 2,7). The hydraulic rams 109 (FIGS. 6,7) are extended to move the rods 110 against a pair of ears 116 (only one being shown) welded or otherwise connected to the protective shroud 71, and thereby move the shroud 71 away from the bore manifold to the position shown in FIG. 7. The swage pin 40 (FIG. 2) and the pull-in cable 36 can be released from the nose 48 of the hub assembly 16, and the running tool 70 pulled up to the surface vessel V by the cable 36.

A plurality of short sections of flowlines 117 (FIG. 3) are each connected between one of the small flowlines S from the subsea wells W (FIG. 1) and a corresponding one of the flowline connectors 21a-21d (FIG. 3). These short sections 117 are flexible enough that the portions 117a (FIGS. 2,3) adjacent the flowline connectors 21a-21d are each movable in a slot 118 in the top of the landing base 10 to facilitate completing the connection between the connectors 21a-21d and the connector hubs 65a-65d (FIG. 7) on the bore manifold 64.

A running tool 122 (FIGS. 2, 8-13) moves each of the smaller flowline connectors 21a-21d into a position adjacent the bore manifold 64 (FIGS. 2,3,7), replaces the annular seal plate assembly 66 if necessary, connects each of the flowline connectors 21a-21d to a corresponding one of the connector hubs 65a-65d and seals the connector elements 21a-21d and 65a-65d together in a fluid-tight relationship. The running tool contains all of the power operated devices for performing these operations and the running tool 122 can be returned to the surface after the subsea connections are completed.

Each of the flowline connectors 21a-21d includes the large cylindrical body member 22b comprising a pair of annular actuation sleeves 124,125 (FIGS. 9-13) slidably mounted about the body member 22a. The axial travel of the sleeves 124,125 is limited by an annular retainer ring 129 (FIG. 9) secured to the body member 22a by a plurality of machine screws 130 (only one of which is shown in FIG. 9). A plurality of dogs 131 (FIG. 11) mounted at the lower end of the actuation sleeve 125 are forced radially inward when the sleeve 125 is moved downward over the dogs to grip the connector hub 65 and lock each of the connectors 21a-21d to a corresponding hub 65 on the bore manifold 64. The sleeve 124 includes an annular groove 126 near the lower end and the sleeve 125 includes an annular groove 127 near the upper end thereof. Other details of the flowline connectors 21a-21d are disclosed in the aforementioned U.S. Pat. No. 4,161,367.

The running tool 122 (FIGS. 2,3,10-13) includes a yoke assembly 140 (FIG. 10) having a generally U-shaped body portion 141, with a pair of arms 142,143 extending axially from the body portion. The running tool is secured to a spacer arm 147 (FIGS. 2,3) by a pair of clamps 148,149 connected to the body portion by a pair of braces 153,154. The spacer arm 147 is welded or otherwise connected to a pair of alignment sleeves 156,157 that fit over the guideposts 11d,11f (FIGS. 2,7) while connecting the connectors 21a,21b to the manifold 64 and fit over the guideposts 11c,11e while the connectors 21c,21d are being connected to the connector hubs 65a,65b on the manifold 64. The upper portions 148a,149a (FIG. 3) of the clamps are secured to the lower portions 148b,149b by a plurality of bolts 155.

A running string 161 (FIG. 3) transports the running tool 122 between the surface vessel V (FIG. 1) and the landing base 10. A plurality of control lines 162 enclosed in the running string 161 provide power to operate a plurality of hydraulic rams and/or electrical equipment in the running tool 122 to perform various tasks such as seal replacement and the connection of flowlines. A plurality of stop members 163 (FIGS. 2,3), welded or otherwise connected to the landing base 10, rest against a portion of the running tool 122 to prevent the running tool from moving about the spacer arm 147 during connecting operations.

The yoke assembly arms 142,143 (FIGS. 8-13) include a pair of upper hydraulic cylinders 167a,167b each connected between a movable piston 168a,168b and an end 142a,143a of the arms 142,143 to move the pistons 168a,168b axially between the position shown in FIG. 9 and the position shown in FIG. 13. A pair of hydraulic rams 169a,169b connected between the pistons 168a,168b and a pair of dogs 170a,170b (FIGS. 8,9,13) move the dogs 170a,170b radially into the annular groove 127 in the actuation sleeve 124 when the rams 168a,168b are extended. To move the connector 21c (FIG. 9) into position adjacent the manifold 64, the dogs 170a,170b are moved into the groove 126 and the hydraulic cylinders 167a,167b are extended to slide the pistons 168a,168b and the actuator sleeve 124 toward the manifold 64. The sleeve 124 presses against the retaining ring 129 to move the ring 129 and the entire connector 21c toward the manifold 64 until the sleeve 125 (FIG. 11) is adjacent the manifold.

The yoke assembly arms 142,143 (FIGS. 8,12) include a pair of lower hydraulic cylinders 174a,174b each connected between the movable piston 175a,175b and the end 142a,143a of the arms 142,143 to move the pistons 175a,175b axially between the position shown in FIG. 9 and the position shown in FIG. 12. A pair of hydraulic rams 176a,176b connected between the pistons 175a,175b and a pair of dogs 177a,177b (FIGS. 9-13) move the dogs 177a,177b radially into the annular groove 127 in the actuation sleeve 125 when the rams 176a,176b are extended. When the dogs 131 (FIGS. 11-13) are adjacent the connector hub 65a the rams 176a,177b are extended to move the dogs 177a,177b into the groove 127 (FIG. 12); the hydraulic cylinders 174a,174b are extended to move the inner sleeve 125 over the dogs 131 and clamp the dogs 131 over the connector hub 65a and secure the connector 21c to the hub 65a.

A pair of hydraulic cylinders 181a,181b and a pair of storage brackets 182a,182b (FIG. 10) connected to the body portion 141 of the running tool 122 are adapted to replace defective sealing plate assemblies 66. Details of the connections between the cylinders 181a, 181b and the brackets 182a,182b are not shown and are not considered to be a part of this invention. When the hydraulic cylinder 181a is retracted the bracket 182a is rotated into a position between the connector hub 65a and the adjacent sleeve 125 with the hub 65a and the sleeve 125 being separated. The dogs 170a,170b are moved into the groove 126 and the connector 21c moved toward the manifold 64 until the defective sealing plate assembly 66a is pressed on to the bracket 182a. The cylinder 181a is extended and the bracket 182a with the defective plate assembly rotate to a position away from the connector hub 65a. The hydraulic cylinder 181b is retracted to rotate the bracket 182b and a new sealing plate assembly 66b into a position between the hub 65a and the connector sleeve 125. The connector is moved against the plate assembly 66b to secure the plate assembly to the connector 21c. Details of the sealing plate assembly and the connector are disclosed in the aforementioned U.S. Pat. No. 4,161,367.

The sequence of operation of pulling the flowline connectors 21a-21d into position and securing the connectors to the connector hub 65 is as follows:

1. The clamps 148,149 are moved along the spacer arm 147 (FIGS. 2,3) until the running tool 122 is positioned for moving one of the connectors, for example, connector 21c, into connection with the corresponding connector hub 65a. The bolts 155 are tightened to secure the clamps 148,149 on the spacer arm 147.

2. The running tool alignment sleeves 156,157 are threaded over the guidelines 12c,12e respectively (FIGS. 1,3) and the running tool lowered from the vessel V (FIG. 1) until the running tool is astride the connector 21c (FIG. 2). A switch (not shown) may be mounted on the running tool 122 or on the landing base 10, if desired, to provide a signal to the surface vessel V (FIG. 1) by cable or other conventional means to indicate that the running tool 122 has landed astride the connector.

3. The hydraulic rams 169a,169b are extended to move locking dogs 170a,170b into the groove 126 (FIG. 9).

4. The hydraulic cylinders 167a,167b are extended to move the connector 21c against the corresponding connector hub 65a.

5. The hydraulic rams 176a,176b are extended to move the locking dogs 177a,177b into the groove 127.

6. The hydraulic cylinders 174a,174b are extended to move the sleeve 125 over the dogs 131 (FIG. 13) to lock the connector 21c to the connector hub 65a.

7. The hydraulic cylinders 167a,167b are retracted to move the sleeve 124 over the dogs 183 (FIG. 12) to set the seal as described in the aforementioned U.S. Pat. No. 4,161,367.

8. The running tool 122 is raised to the deck of the surface vessel V (FIG. 1), the bolts 155 are loosened, the clamps 148,149 are moved along the spacer arm 147 into a position for servicing the connector 21d (FIGS. 2,3) and the bolts tightened to secure the clamps 148,149 on the spacer arm.

9. The running tool 122 is lowered over the guidelines 12c,12e until the running tool is astride the connector 21d and the connector 21d is connected to the connector hub 65b using the procedure listed in the above steps 3-7.

10. The running tool 122 is again raised to the surface vessel V, the tool removed from the guidelines 12c, 12e and threaded on to the guidelines 12d,12f (FIGS. 1-3) and lowered to service the connector 21a using the steps 2-7 above.

11. The running tool 122 is raised to the surface vessel V and positioned to service the connector 21b using the steps 2-7 above.

FIGS. 14 and 15 illustrate other embodiments of the flowline bundle hub assembly wherein the bore manifold area is different than the embodiment of FIGS. 1-13. In the embodiment shown in FIG. 14 a generally circular bore manifold 64a includes a plurality of connector hubs 65 which are spaced about the manifold 64a. These connector hubs 65 can be connected to flowline connectors of the same type as connectors 21a-21d of FIG. 2.

Another flowline bundle hub assembly, a portion of which is shown in FIG. 15, includes a bore manifold 64b having a plurality of connector hubs 65 mounted at approximately 45 degrees to the axis of the flowline bundle B. The guideposts 11 are positioned differently than in the embodiment of FIGS. 1-13 in order to properly position a running tool which would be used to complete the connection between the connector hubs 65 and the flowline connectors 21a,21b. A remaining portion (not shown) of the assembly of FIG. 15 may also include additional connector hubs 65.

The present invention provides apparatus for remotely moving a large diameter flowline bundle into position for connection to a plurality of smaller flowline connectors using a single pull-in cable. The smaller flowline connectors can each be precisely aligned and connected to corresponding connector lugs connected to the large diameter flowline bundle. Relatively small amounts of force are required for the connection which is directed by remote control from the surface of the sea.

Although the best mode contemplated for carrying out the present invention has been herein shown and described, it will be apparent that modification and variation may be made without departing from what is regarded to be the subject matter of the invention.

What is claimed is:

1. Apparatus for connecting a large diameter flowline bundle to a plurality of smaller flowlines, said apparatus comprising:
   a first connector mounted on one end of said large flowline bundle, said first connector having a plurality of connector hubs each connected to said large flowline bundle;

a pull-in cable;

means for connecting said pull-in cable to the geometric center of said first connector;

a plurality of small connectors each mounted on one end of a corresponding one of said smaller flowlines;

means for moving said pull-in cable and said first connector into a fixed position adjacent said small connectors;

means for connecting each of said small connectors in precise axial alignment with the corresponding one of said connector hubs; and means for sealing each of said small connectors in a fluid-tight relationship with a corresponding one of said connector hubs.

2. Connecting apparatus as defined in claim 1 including means for moving the free end of each of said small connectors into axially aligned engagement with a corresponding one of said connector hubs on said first connector when said first connector is secured in said fixed position.

3. Connecting apparatus as defined in claim 1 including means for securing said first connector in said fixed position adjacent said small connectors.

4. Connecting apparatus as defined in claim 1 including means for disconnecting said pull-in cable after said first connector has been secured in said fixed position.

5. Connecting apparatus as defined in claim 1 including means for setting a fluid-tight seal between the end of each of said small connectors and a corresponding one of said connector hubs.

6. Connecting apparatus as defined in claim 1 wherein the axial alignment of each of said connector hubs and of said small connectors is substantially at right angles to the axial alignment of said large diameter flowline bundle.

7. Connecting apparatus as defined in claim 1 including an alignment funnel mounted near said small connectors, and means for moving a portion of said first connector into said funnel to secure said first connector in said fixed position adjacent said small connectors.

8. Connecting apparatus as defined in claim 1 wherein said first connector includes a shroud covering said connector hubs as said first connector is moved into said fixed position adjacent said small connectors, and means for removing said shroud prior to connecting said small connectors to said connector hubs.

9. Connecting apparatus for connecting individual bundled flowlines of a large diameter flowline bundle to a plurality of smaller flowlines, said apparatus comprising:

a connector manifold having a plurality of connector hubs mounted on said manifold;

means for connecting each of said connector hubs to one of said bundled flowlines;

a plurality of connectors each connected to a corresponding one of said smaller flowlines;

a mounting base;

means for mounting each of said connectors in said mounting base;

means for moving said connector manifold atop said mounting base with each of said connector hubs adjacent a corresponding one of said connectors;

means for connecting each of said connectors in precise axial alignment with a corresponding one of said connector hubs; and means for sealing each of said connectors in a fluid-tight relationship with a corresponding one of said connector hubs.

10. Connecting apparatus as defined in claim 9 including a sealing member mounted between each of said connector hubs and a corresponding one of said connectors, and means for providing precise axial alignment of each of said connectors with its hub prior to setting said sealing member.

11. Connecting apparatus as defined in claim 9 wherein said means for moving includes a pull-in cable, means for connecting said pull-in cable to the geometric center of said connector manifold, and means for pulling said cable to move said connector manifold on to said mounting base.

12. Connecting apparatus as defined in claim 11 including means for providing rotational movement of said connector manifold as said connector manifold is pulled on to said mounting base to axially align each of said connector hubs with a corresponding one of said connectors.

13. A method of moving a large diameter flowline bundle into position adjacent a plurality of smaller flowline connectors and of connecting the smaller connectors to connector hubs on an end portion of the flowline bundle, said method comprising the steps of:

(1) connecting a pull-in cable to the geometric center of said flowline bundle;

(2) pulling said flowline bundle into a position with said connector hubs adjacent said smaller flowline connectors;

(3) moving each of said flowline connectors into precise axial alignment with a corresponding one of said connector hubs;

(4) securing each of said flowline connectors to a corresponding one of said connector hubs; and (5) setting an individual seal between each of said flowline connectors and its corresponding connector hub to provide a fluid-tight seal between each of said flowline connectors and its connector hub.

14. A method of completing connections between a large diameter flowline and a plurality of smaller flowlines comprising the steps of:

(1) mounting a plurality of smaller flowline connectors on a landing base;

(2) connecting each of said flowline connectors to a corresponding one of said smaller flowlines;

(3) mounting a plurality of connector hubs on an end portion of said large flowline;

(4) connecting a pull-in cable to the geometric center of said end portion of said large flowline;

(5) pulling said connector hubs into a position adjacent said flowline connectors using said pull-in cable;

(6) moving each of said flowline connectors into precise axial alignment with a corresponding one of said connector hubs;

(7) securing each of said flowline connectors to its corresponding connector hub; and (8) setting an individual seal between each of said flowline connectors and its corresponding connector hub to provide a fluid-tight connection.

* * * * *